(12) United States Patent
Carlomagno

(10) Patent No.: US 8,013,276 B2
(45) Date of Patent: Sep. 6, 2011

(54) PRECISION SOLDERING TWEEZERS WITH ARMS HAVING ADJUSTABLY POSITIONAL DISTAL ENDS

(75) Inventor: Michael Carlomagno, Chico, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1717 days.

(21) Appl. No.: 11/128,693

(22) Filed: May 12, 2005

(65) Prior Publication Data

US 2006/0226198 A1      Oct. 12, 2006

Related U.S. Application Data

(60) Provisional application No. 60/669,566, filed on Apr. 8, 2005.

(51) Int. Cl.
*H05B 1/00* (2006.01)
*H05B 3/02* (2006.01)
*H02G 1/12* (2006.01)

(52) U.S. Cl. .......... 219/227; 219/221; 219/229; 228/55; 81/9.41

(58) Field of Classification Search .............. 219/221, 219/227–231, 233, 236–239, 242; 228/51–55; 132/210, 211, 73.5, 216; 81/9.4, 9.51, 9.41, 9.42–9.44
See application file for complete search history.

(56) References Cited

U.S. PATENT DOCUMENTS

| 1,758,490 | A |   | 5/1930 | Aderer |
|---|---|---|---|---|
| 2,449,521 | A |   | 9/1948 | Warner |
| 3,117,216 | A |   | 1/1964 | Stewart |
| 3,629,541 | A | * | 12/1971 | Mims et al. ............. 219/86.21 |
| 3,752,017 | A | * | 8/1973 | Lloyd et al. .............. 81/9.44 |
| 3,924,332 | A |   | 12/1975 | Rauch et al. |
| 4,626,658 | A |   | 12/1986 | Gray et al. |
| 6,513,697 | B1 | * | 2/2003 | Sines et al. ................ 228/51 |
| 2004/0206740 | A1 |   | 10/2004 | Miyazaki |

OTHER PUBLICATIONS

Hakko Products, http://www.hakkousa.com/products, Jul. 28, 2005, 3 pp.

* cited by examiner

*Primary Examiner* — Stephen Ralis
(74) *Attorney, Agent, or Firm* — Christie, Parker & Hale, LLP

(57) ABSTRACT

A pair of soldering tweezers having a first arm having a distal end that is adjustably positionable in a direction parallel to its central longitudinal axis and a second arm having a distal end that is adjustably positionable in a direction perpendicular to its central longitudinal axis. The tweezers also include a biasing mechanism configured to urge the distal ends of the first and second arms apart.

16 Claims, 4 Drawing Sheets

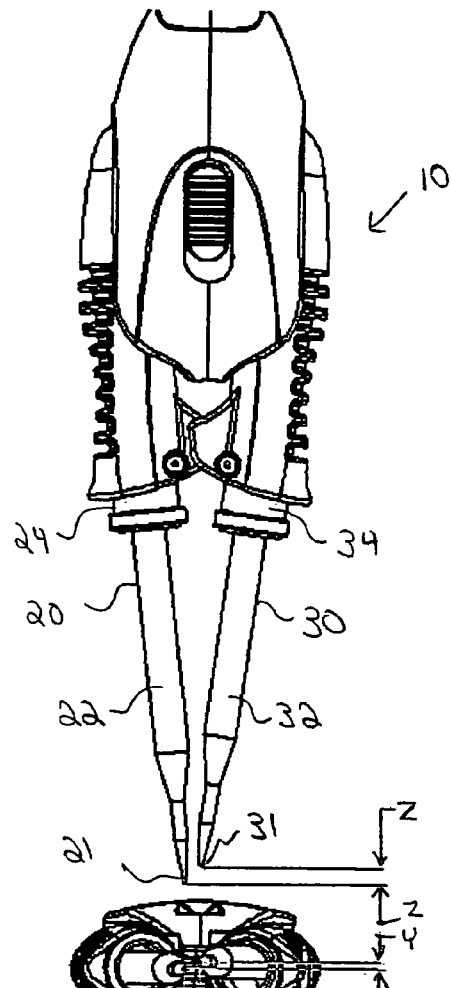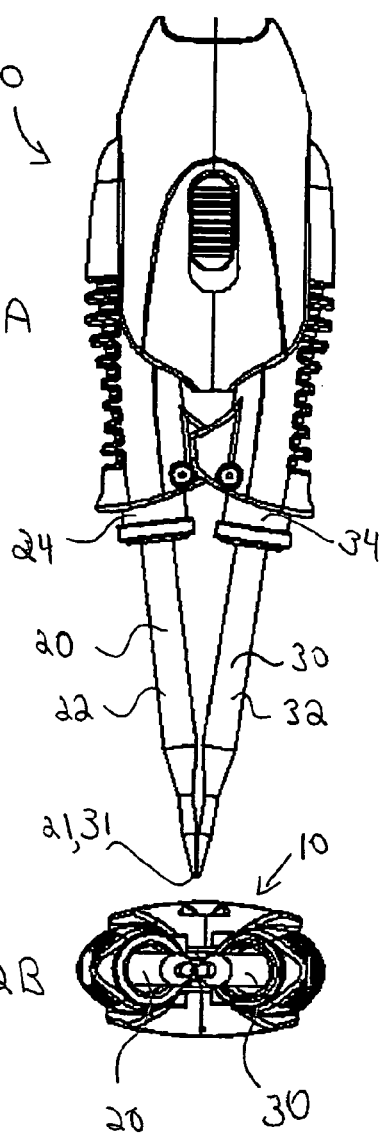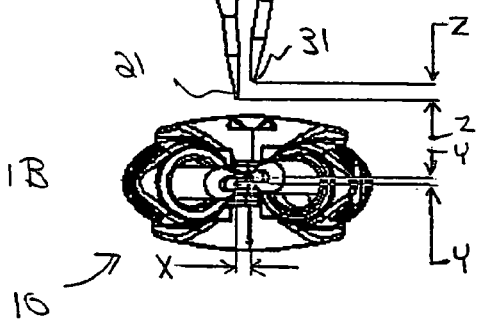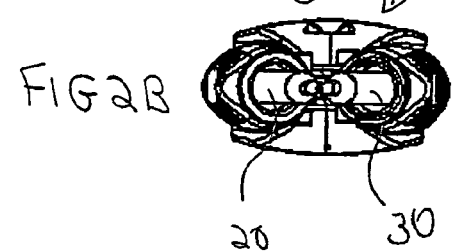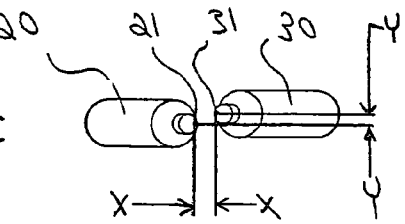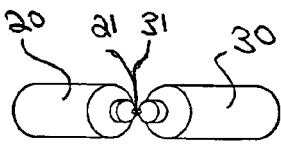

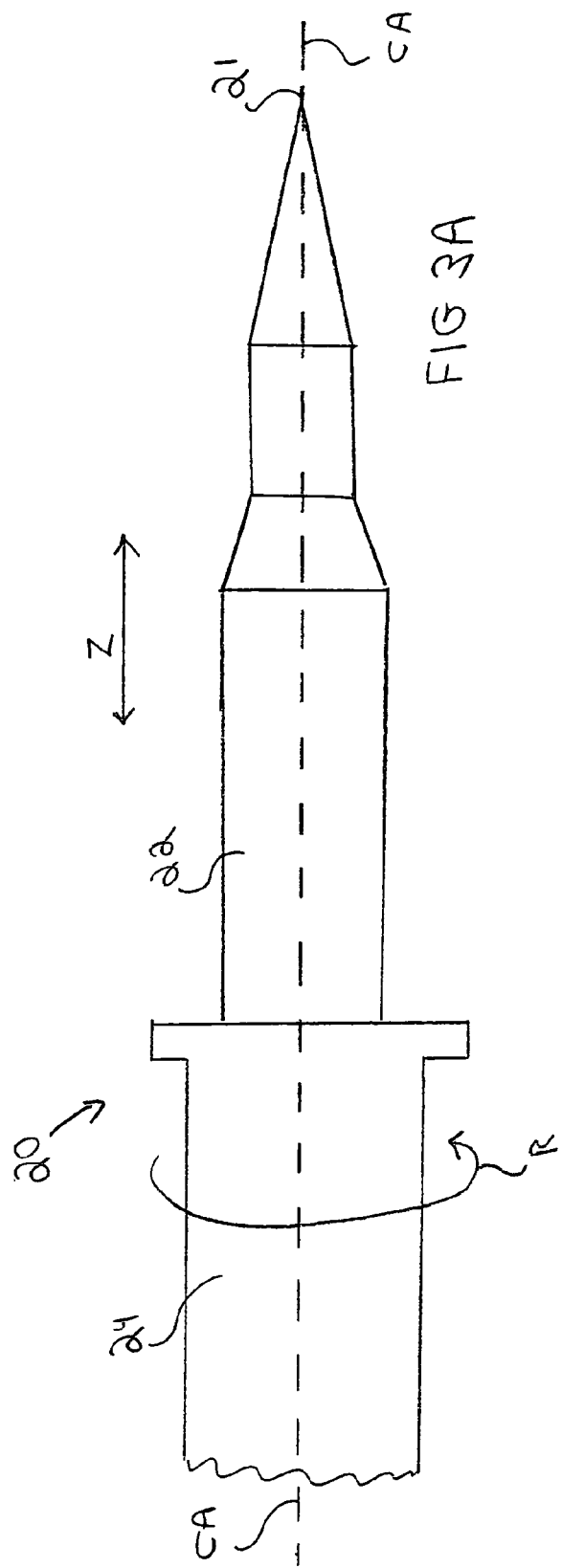
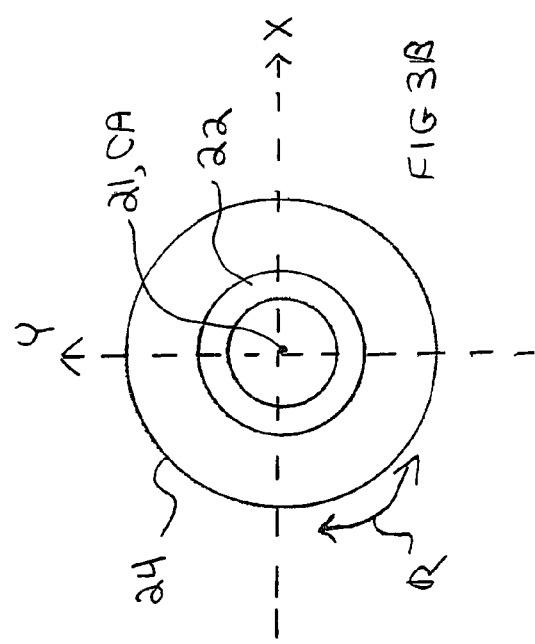

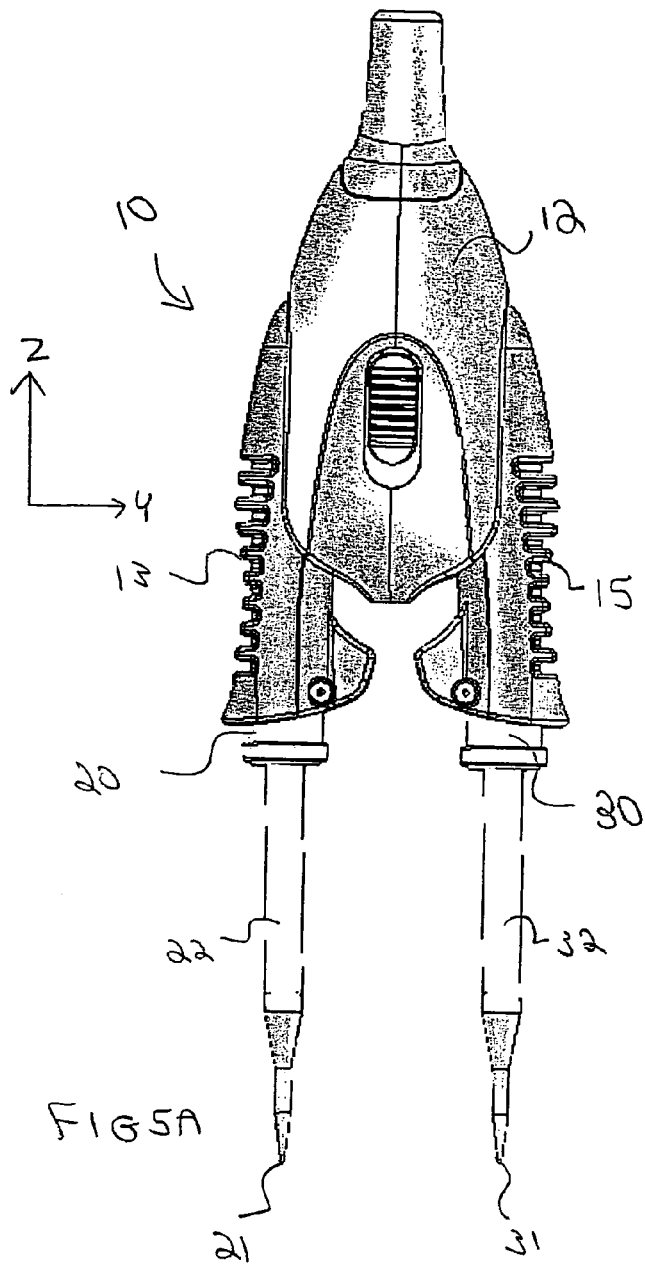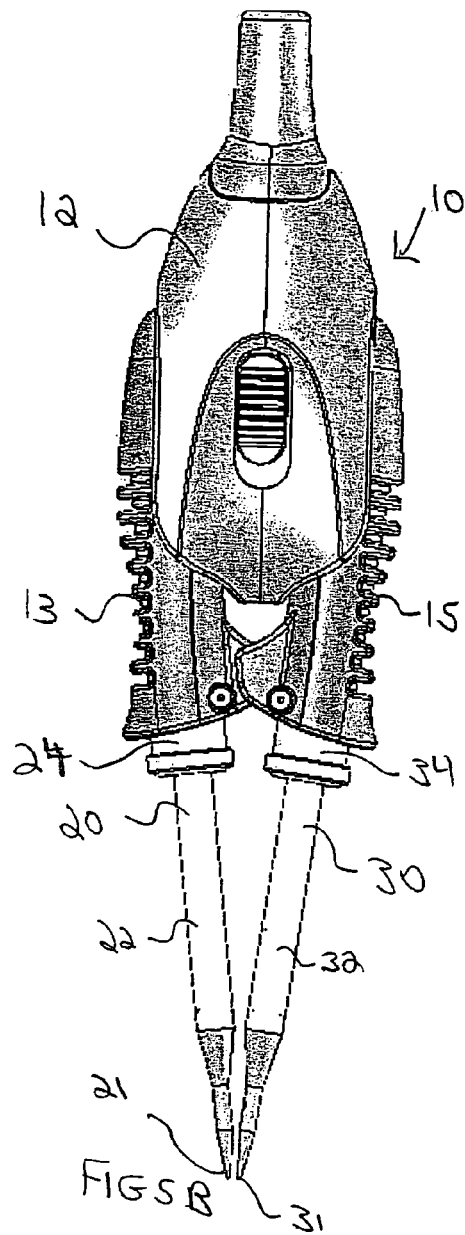
FIG 5A
FIG 5B

PRECISION SOLDERING TWEEZERS WITH ARMS HAVING ADJUSTABLY POSITIONAL DISTAL ENDS

RELATED APPLICATIONS

This application claims priority to U.S. provisional patent application No. 60/669,566 filed Apr. 8, 2005 entitled Precision Soldering Tweezers with Arms having Adjustably Positional Distal Ends.

TECHNICAL FIELD

The present invention is related to soldering tweezers.

BACKGROUND OF THE INVENTION

The fabrication of modern electronic systems typically involves the attachment of electronic components onto printed circuit boards. Such components are first aligned and positioned at the desired location on the circuit board, and are then soldered into position. Such aligning, positioning and soldering of electronic components requires precise handling and control.

When assembling electronic systems, the various electronic components are sequentially placed onto a printed circuit board such that the leads are precisely positioned at desired locations on the printed circuit board, and are then soldered into position. The alignment of such electronic components may be carried out by means of various hand tools.

In addition, diverse electronic components have different sizes, shapes and may have different orientation on component platforms. For example, modern electronic components may vary from as small as 1 mm×1 mm to as big as 160 mm×120 mm. The shapes may vary from rectangular, square, rhomboid to round. The orientation on the component platform may vary in different angular increments. In addition, the smaller the components become in size the more difficult it is to handle them.

Accordingly, when handling, aligning and positioning components of different sizes manually, it is necessary to take the size, shape and orientation of the components into account. As a result, it becomes challenging to keep fine points of soldering tweezers cartridges/tips in perfect alignment between each other when soldering.

Another hurdle that arises in such applications is mechanical damage and wear to the tweezers cartridges/tips which affects the symmetry of cartridge/tips.

A wide range of soldering hand tools are used in the industry to address the above problems. Unfortunately, they do not resolve the above problems completely.

SUMMARY OF THE INVENTION

The present invention provides a precise tweezers hand tool for manual electronic component mounting, which is capable of precise handling, positioning and alignment of a wide range of electronic components onto various component platforms.

In a preferred embodiment, the present invention provides a pair of soldering tweezers, having: a first arm having a distal end that is adjustably positionable in a direction parallel to the central longitudinal axis of the first arm; a second arm having a distal end that is adjustably positionable in a direction perpendicular to the central longitudinal axis of the second arm; and a biasing mechanism configured to urge the distal ends of the first and second arms apart.

The distal ends of each of the first and second arms are preferably adjustably positioned by rotation of at least a portion of each of the respective first and second arms. In preferred embodiments, first (i.e.: distal) portions of the first and second arms are removable heating tips or heating tip cartridges that are received into the respective second (i.e.: proximal) portions of the respective first and second arms. The second portions of the first and second arms are connected together by the biasing mechanism.

In preferred embodiments, the distal end of the first arm is moveable along the central longitudinal axis of the arm. Also in preferred embodiments, the distal end of the second arm is preferably adjustably positionable in a direction perpendicular to the central longitudinal axis of the arm. In one embodiment, the distal end of the second arm is simultaneously adjusted in first and second directions that are perpendicular to the central longitudinal axis of the arm. For example, the distal end of the second arm may be simultaneously adjusted in X- and Y-directions (with the Z-direction being the central longitudinal axis of the arm). Alternately, however, the distal end of the second arm may be independently adjusted in first and second directions that are perpendicular to the central longitudinal axis of the arm. For example, the distal end of the second arm may be independently adjusted in each of X- and Y-directions (with the Z-direction again being the central longitudinal axis of the arm).

The first and second arms are connected together at a pivot point with a biasing mechanism that urges the distal ends of the arms apart. The biasing mechanism may optionally comprise a spring. During soldering, an operator then grasps onto the tweezers and squeezes their distal ends shut.

As such, the present invention optionally includes a main body in which the biasing mechanism is disposed. The first and second arms then extend from this main body.

In further optional embodiments, finger gripping surfaces may be provided on each of the first and second arms.

BRIEF DESCRIPTION OF THE DRAWINGS

FIG. 1A is a side elevation view of the present invention with the distal ends of the first and second arms displaced from one another in X-, Y- and Z-directions.

FIG. 1B is a bottom plan view corresponding to FIG. 1A.

FIG. 1C is a schematic corresponding to the bottom plan view of FIG. 1B.

FIG. 2A is a side elevation view of the present invention with the distal ends of the first and second arms aligned with one another in X-, Y- and Z-directions.

FIG. 2B is a bottom plan view corresponding to FIG. 2A.

FIG. 2C is a schematic corresponding to the bottom plan view of FIG. 2B.

FIG. 3A is a side elevation view of first arm 20.

FIG. 3B is a distal end view of first arm 20.

FIG. 5A is side elevation view of the tweezers in an open position prior to use.

FIG. 5B is side elevation view of the tweezers as held in an closed position during use.

DETAILED DESCRIPTION OF THE DRAWINGS

Figure 4A:
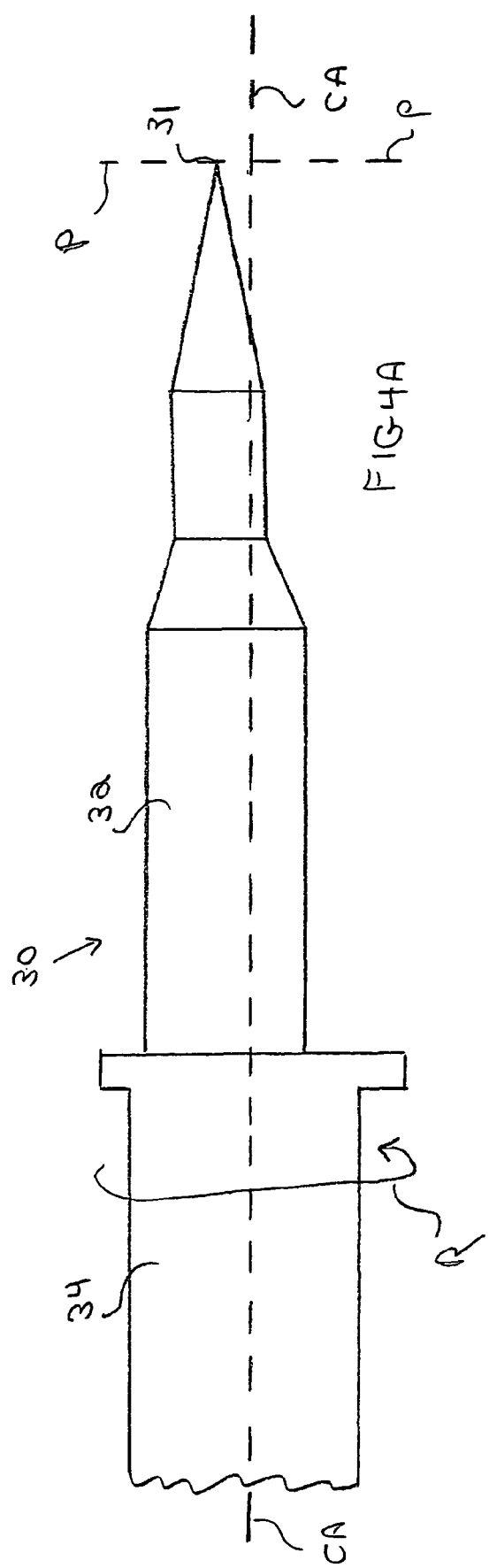
FIG. 4A is a side elevation view of second arm 30.

The present invention provides a pair of soldering tweezers configured for precision alignment and operation.

FIGS. 1A to 1C show tweezers 10 with the distal end 21 of arm 20 and the distal end 31 of arm 30 positioned out of alignment (i.e.: displaced from one another in the X, Y and Z directions).

FIGS. 2A to 2C show tweezers 10 with the distal end 21 of arm 20 and the distal end 31 of arm 30 positioned in alignment with one another.

FIGS. 3A to 4B show further details of the positioning system for each of the two arms 20 and 30. Lastly, FIGS. 5A and 5B show the tweezers in their open, prior to use position (FIG. 5A) and their closed, in-use position when squeezed together by an operator's hand (not shown).

As seen in FIGS. 1A to 1C, tweezers 10 have first and second arms 20 and 30. First and second arms 20 and 30 have respective distal ends 21 and 31. As can be seen in FIG. 1A, distal ends 21 and 31 are displaced from one another in the Z-axis by a small distance "Z". As can also be seen in FIGS. 1B and 1C, distal ends 21 and 31 are displaced from one another in the X-axis by a small distance "X" and in the Y-axis by small distance "Y".

In various embodiments of the invention, the movement of distal end 31 may be adjusted simultaneously in X- and X-directions (for example, by rotating distal end 31 around central longitudinal axis CA). Alternately, however, the movement of distal end 31 may be adjusted independently in each of the separate X- and X-directions (for example, by a first mechanism adjusting movement in the X-direction and a second mechanism adjusting movement in the Y-direction).

As will be explained below with respect to FIGS. 3A and 3B, the first arm 20 has a distal end 21 that is adjustably positionable in a direction parallel to its central longitudinal axis CA. In addition, as will be shown in FIGS. 4A and 4B, the second arm 30 has a distal end 31 that is adjustably positionable in a direction perpendicular to its central longitudinal axis CA.

As a result, as seen in FIGS. 2A to 2C, the position of a distal end 21 of first arm 20 and the position of distal end 31 of second arm 30 can be adjusted such that distal ends 21 and 31 can be brought into contact with one another (or moved to other desired locations with respect to one another).

In various embodiments, such adjustment is accomplished by moving distal end 21 in a general Z-direction, and by moving distal end 31 in general X- and Y-directions. However, it is to be understood that since each of arms 20 and 30 may be positioned at various angles with respect to one another, the relative movement of distal end 21 may not be solely in a Z-direction. Similarly, the relative movement of distal end 31 may not be solely in X- and Y-directions. This is especially true, for example, when distal ends 21 and 31 are positioned close together when grasping an object (FIGS. 1A and 5B). However, when arms 20 and 30 are positioned parallel to one another (FIG. 5A), the movement of distal end 21 will be solely in a Z-direction and the movement of distal end 31 will be solely in X- and Y-directions.

Accordingly, as shown in FIG. 3A, the distal end 21 of first arm 20 is preferably more accurately described as being moved in a direction parallel to the central longitudinal axis CA of arm 20. Most preferably, the distal end 21 of arm 20 is simply moved along the central longitudinal axis CA itself. In various embodiments, arm 20 includes a first portion 22 and a second portion 24 wherein distal end 21 is moved back and forth along central longitudinal axis CA by simply rotating second portion 24 back and forth in direction R. An optional screw-type mechanism in arm 20 may be used to achieve such movement. As a result, rotation of second portion 24 in direction R may result in movement of first portion 22 along central axis CA. Thus, first portion 22 may move in and out (in direction Z) of second portion 24 when second portion 24 is rotated back and forth in direction R. FIG. 3B shows that distal end 21 is preferably co-linear with central longitudinal axis CA. Thus, rotation of arm 20 does not move distal end 21 away from central longitudinal axis A.

Figure 4B:
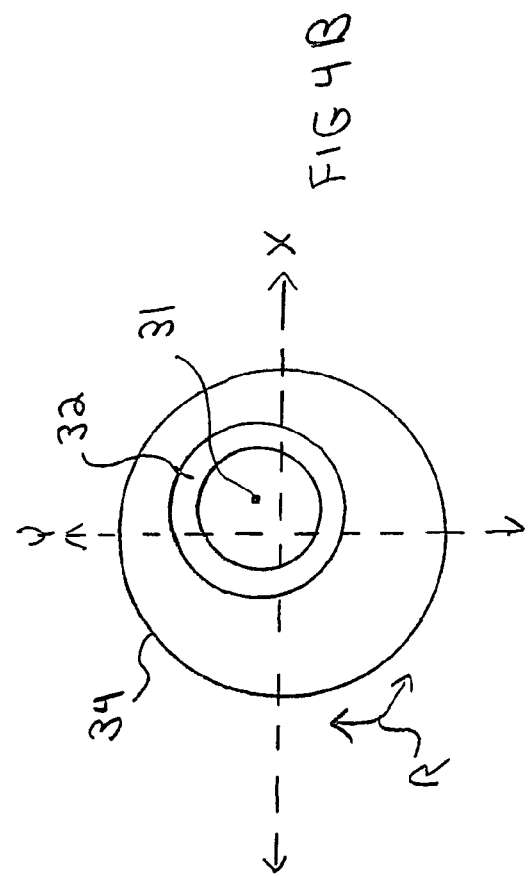
FIG. 4B is a distal end view of second arm 30.

As shown in FIG. 4A, the distal end 31 of second arm 30 may be moved in a plane P that is preferably perpendicular to central longitudinal axis CA, as shown. For example, the distal end 31 (and the first portion 32) of second arm 30 may simply be formed so as to be slightly offset from the central longitudinal axis CA extending through second portion 34 of arm 30. As a result, when first portion 32 of second arm 30 is rotated in direction R about central longitudinal axis CA, distal end 31 will be moved in a circle around central longitudinal axis CA. As a result, distal end 31 can be moved to various radial positions around central longitudinal axis CA, thereby being displaced by up to a maximum X distance in the X-direction, and up to a maximum Y distance in the Y-direction, as shown in FIG. 4B. In preferred embodiments, first and second portions 32 and 34 of second arm 30 may therefore move together as a single unit.

Lastly, FIG. 5A shows tweezers 10 in a "sprung apart" position. A spring or other suitable biasing mechanism is found in main body 12. The biasing mechanism urges arms 20 and 30 apart from one another. In operation, as shown in FIG. 5B, a user's hand (not shown) presses against finger gripping surfaces 13 and 15, squeezing the tweezers together. The tweezers are then activated (i.e.: turned on) such that the distal ends 21 and 31 become heated, and thereby effect soldering therebetween.

In preferred embodiments, the first portions 22 and 32 of the first and second arms 20 and 30, comprise removable cartridges that are received into the second portions 24 and 34 of the respective first and second arms 20 and 30. As a result, the first portions 22 and 32 may be disposed of and replaced when they have reached the end of their useful lives.

What is claimed is:

1. A pair of soldering tweezers, comprising:
    a first arm and a second arm, each arm having a distal end in alignment with one another, and wherein the distal end of only the first arm is adjustably positionable in a direction parallel to a central longitudinal axis of the first arm, and the distal end of only the second arm is adjustably positionable in a direction perpendicular to a central longitudinal axis of the second arm, upon the distal ends of the first and second arms becoming displaced from one another; and
    a biasing mechanism configured to urge the distal ends of the first and second arms apart.

2. The soldering tweezers of claim 1, wherein the distal end of the second arm is adjustably positionable by rotation of at least a portion of the second arm.

3. The soldering tweezers of claim 1, wherein a distal end of the second arm is adjustably positionable in a plane perpendicular to the central longitudinal axis of the arm.

4. The soldering tweezers of claim 1, further comprising:
    a main body, wherein the biasing mechanism is disposed within the main body, and wherein the first and second arms extend from the main body.

5. The soldering tweezers of claim 1, further comprising:
    finger gripping surfaces on each of the first and second arms.

6. The soldering tweezers of claim 1, wherein first portions of the first and second arms comprise removable heating tips that are received into second portions of the first and second arms.

7. The soldering tweezers of claim 1, wherein upon the distal ends becoming displaced from one another, the distal ends of the first and second arms are out of alignment in at least one of X-, Y- and/or Z-directions.

8. The soldering tweezers of claim 1, wherein the distal end of the second arm is positioned away from the central longitudinal axis of the second arm.

9. The soldering tweezers of claim 8, wherein rotation of at least a portion of the second arm moves the distal end of the second arm around the central longitudinal axis of the arm.

10. The soldering tweezers of claim 1, wherein a distal end of the second arm is adjustably positionable in a first direction that is perpendicular to the central longitudinal axis of the arm, and is also adjustably positionable in a second direction that is perpendicular to the central longitudinal axis of the arm, wherein the first and second directions are perpendicular to one another.

11. The soldering tweezers of claim 10, wherein the distal end of the second arm is independently positionable in each of the first and second directions.

12. The soldering tweezers of claim 1, wherein the distal end of the first arm is adjustably positionable by rotation of at least a portion of the first arm.

13. The soldering tweezers of claim 12, wherein the distal end of the first arm is positioned co-linear with a central longitudinal axis of the first arm.

14. The soldering tweezers of claim 12, wherein the first arm includes a first portion and a second portion, wherein the distal end is on the first portion and wherein rotation of the second portion results in movement of the first portion into, or out of, the second portion.

15. A pair of soldering tweezers, comprising:
   a pair of arms, each having a distal end in alignment with one another;
   a biasing mechanism configured to urge the distal ends of the pair of arms apart;
   wherein each of the arms is adjustably positionable to align the distal ends with one another upon the distal ends becoming displaced from one another; wherein one of the arms is adjustably positionable in only a direction parallel to a central longitudinal axis of the arm; and wherein the other arm is adjustably positionable in only a direction perpendicular to a central longitudinal axis of the arm.

16. The soldering tweezers of claim 15, wherein the distal ends of each arm is adjustably positionable by rotation of at least a portion of the each arm.

* * * * *